US008785567B2

(12) United States Patent
Hsueh

(10) Patent No.: US 8,785,567 B2
(45) Date of Patent: Jul. 22, 2014

(54) LIQUID CRYSTAL ALIGNMENT AGENT, FILM AND DISPLAY ELEMENT

(75) Inventor: Huai-Pin Hsueh, Tainan (TW)

(73) Assignee: Chi Mei Corporation, Tainan (TW)

( * ) Notice: Subject to any disclaimer, the term of this patent is extended or adjusted under 35 U.S.C. 154(b) by 61 days.

(21) Appl. No.: 13/159,300

(22) Filed: Jun. 13, 2011

(65) Prior Publication Data

US 2011/0313126 A1 Dec. 22, 2011

(30) Foreign Application Priority Data

Jun. 22, 2010 (TW) .............................. 99120253 A

(51) Int. Cl.
*C08G 73/12* (2006.01)
*C08L 79/08* (2006.01)
*G02F 1/1337* (2006.01)

(52) U.S. Cl.
CPC ............... *C08G 73/12* (2013.01); *C08L 79/085* (2013.01); *G02F 1/133723* (2013.01)
USPC ....................................................... 525/419

(58) Field of Classification Search
CPC .. C08G 73/12; C08L 79/085; G02F 1/133723
USPC ........ 252/299.4; 525/419, 425, 428; 528/170, 528/229, 322
See application file for complete search history.

(56) References Cited

U.S. PATENT DOCUMENTS

| 5,578,697 | A * | 11/1996 | Kawamonzen et al. ...... 528/353 |
| 7,524,541 | B2 | 4/2009 | Tsutsui et al. | |
| 2002/0045033 | A1 | 4/2002 | Uhara et al. | |
| 2004/0031950 | A1 | 2/2004 | Shimizu et al. | |
| 2004/0192804 | A1 | 9/2004 | Kura et al. | |
| 2005/0272907 | A1 | 12/2005 | Jin et al. | |
| 2006/0051525 | A1 | 3/2006 | Tsutsui et al. | |
| 2007/0071913 | A1 | 3/2007 | Fujii et al. | |
| 2009/0226640 | A1 | 9/2009 | Hsueh | |
| 2009/0280236 | A1* | 11/2009 | Hsueh ............................ 427/58 |
| 2009/0286087 | A1 | 11/2009 | Tanaka et al. | |
| 2011/0255042 | A1 | 10/2011 | Hsueh | |
| 2012/0058262 | A1 | 3/2012 | Hsueh | |
| 2012/0101224 | A1 | 4/2012 | Tsai | |
| 2012/0162588 | A1 | 6/2012 | Tsai | |
| 2012/0289633 | A1 | 11/2012 | Liang | |
| 2013/0053513 | A1 | 2/2013 | Tsai | |

FOREIGN PATENT DOCUMENTS

| EP | 0 527 439 A1 | 2/1993 |
| JP | 01040529 | * 2/1989 |
| JP | 2-282726 A | 11/1990 |
| JP | 3-179323 A | 8/1991 |
| JP | 7-043725 A | 2/1995 |
| JP | 7-110484 A | 4/1995 |
| JP | 7-234410 A | 9/1995 |
| JP | 10-333153 A | 12/1998 |
| JP | 11-193345 A | 7/1999 |
| JP | 2002-162630 A | 6/2002 |
| JP | 2003-096034 A | 4/2003 |
| JP | 2006-023344 A | 1/2006 |
| JP | 2006-028098 A | 2/2006 |
| JP | 2009-229935 A | 10/2009 |
| TW | 200940484 A1 | 10/2009 |
| WO | WO-00/61684 A1 | 10/2000 |
| WO | WO-2007/078153 A1 | 7/2007 |

OTHER PUBLICATIONS

U.S. Appl. No. 13/572,350, filed Aug. 10, 2012, by Tsai, Tsung-Pei.
Machine English Translation of JP-2009-229935, Shimizu et al., Oct. 8, 2009, 41 pages.
Search Report dated Mar. 15, 2013 for Taiwan Patent Application No. 099120253, filed on Jun. 22, 2010, two pages. (with English Translation).
The Dow Chemical Company. (2012). "Butyl Cellosolve™ Solvent," Technical Data Sheet. 3 pages.
Sigma-Aldrich, Inc. (Apr. 2012). "Sigma," Product Information, 1 page.

* cited by examiner

*Primary Examiner* — Gregory Listvoyb
(74) *Attorney, Agent, or Firm* — Morrison & Foerster LLP

(57) ABSTRACT

A liquid crystal alignment agent includes a polymer and an organic solvent for dissolving the polymer. The polymer contains a repeating structural unit represented by the following formula (I):

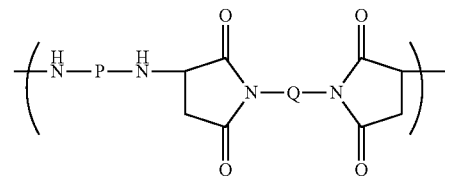

wherein each of P and Q is a divalent organic group. The liquid crystal alignment agent has a viscosity in the range from 5 to 40 cps at 25° C.
A liquid crystal alignment film made of the liquid crystal alignment agent and a liquid crystal display element including the liquid crystal alignment film are also disclosed.

5 Claims, No Drawings

LIQUID CRYSTAL ALIGNMENT AGENT, FILM AND DISPLAY ELEMENT

CROSS-REFERENCE TO RELATED APPLICATION

This application claims priority of Taiwanese Application No. 099120253, filed on Jun. 22, 2010.

BACKGROUND OF THE INVENTION

1. Field of the Invention

This invention relates to a liquid crystal alignment agent, more particularly to a liquid crystal alignment agent having improved alignment properties. The invention also relates to a liquid crystal alignment film formed from the liquid crystal alignment agent, and a liquid crystal display element including the liquid crystal alignment film.

2. Description of the Related Art

A liquid crystal display element is widely used in a screen of a computer, a viewfinder of a camera, a projection display, a television screen, or the like.

Nematic liquid crystal display elements are predominantly used in general liquid crystal display elements, and concrete examples of the nematic liquid crystal display elements actually used include: (1) a TN (Twisted Nematic) liquid crystal display element, in which a liquid crystal alignment direction of one side substrate is twisted at a 90 degree angle relative to a liquid crystal alignment direction of the other side substrate; (2) a STN (Super Twisted Nematic) liquid crystal display element, in which a liquid crystal alignment direction of one side substrate is twisted at an angle greater than 180 degrees relative to a liquid crystal alignment direction of the other side substrate; and (3) a TFT (Thin Film Transistor) liquid crystal display element which uses a thin film transistor.

It has been continuously attempted in the art to improve a liquid crystal alignment film in order to enhance the display performance of the liquid crystal display elements.

The liquid crystal alignment film is made of a liquid crystal alignment agent. Conventionally, the liquid crystal alignment agent is formulated by dissolving polyamic acid or soluble polyimide in an organic solvent, and is then applied and cured on a substrate to form the liquid crystal alignment film. Although the liquid crystal alignment film formed from the conventional liquid crystal alignment agent formulated from polyamic acid or polyimide has good heat resistance, stability of the pretilt angle thereof is not satisfactory.

JP 07-110484 (A) discloses a liquid crystal alignment film, which contains a polymer having a repeating unit expressed by a formula recited therein, and which is used to obtain a stable large pretilt angle and excellent orienting characteristics of a liquid crystal and to obtain good electro-optic characteristics.

JP 07-043725 (A) provides an oriented film which has a stable and high pretilt angle and good electro-optical characteristics by containing a polymer having a specific repeating unit defined therein.

However, in addition to the expected polymer such as polyaspartamide, there is also contained a relatively large amount of residual reactants in the product. Therefore, the liquid crystal alignment agent made from the polymer may have a problem of inferior storage stability.

It is still required in the art to develop a liquid crystal alignment agent which can effectively reduce an image sticking phenomenon and which has improved storage stability.

SUMMARY OF THE INVENTION

Therefore, an object of the present invention is to provide a liquid crystal alignment agent which has improved alignment properties.

According to the first aspect of this invention, there is provided a liquid crystal alignment agent, which includes a polymer and an organic solvent for dissolving the polymer. The polymer contains a repeating structural unit represented by the following formula (I):

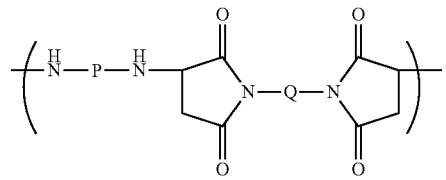

wherein each of P and Q is a divalent organic group. The liquid crystal alignment agent has a viscosity ranging from 5 to 40 cps at 25° C.

According to the second aspect of this invention, there is provided a liquid crystal alignment film formed from the liquid crystal alignment agent of this invention.

According to the third aspect of this invention, there is provided a liquid crystal display element including the liquid crystal alignment film of this invention.

DETAILED DESCRIPTION OF THE PREFERRED EMBODIMENTS

The liquid crystal alignment agent of the present invention includes a polymer, an organic solvent for dissolving the polymer, and an optional additive. The polymer contains a repeating structural unit represented by the following formula (I);

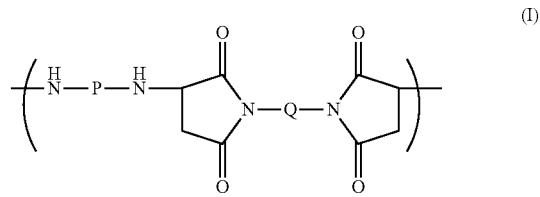

wherein each of P and Q is a divalent organic group. The liquid crystal alignment agent has a viscosity ranging from 5 to 40 cps at 25° C.

Polymer:

There is no specific limitation to the method for producing the polymer. The polymer can be obtained by a general synthesis method, for example, by subjecting a bismaleimide compound and a diamine compound to conduct a polymerization in an organic solvent. Preferably, a suitable amount of catalyst can be used to promote the polymerization. Examples of the catalyst suitable for the polymerization include glacial acetic acid, acetic acid, propionic acid, or the like.

The bismaleimide compound is used generally in an amount from 1 to 2 moles, preferably in an amount from 1 to 1.5 moles, based on 1 mole of the diamine compound. When the bismaleimide compound is used in an amount more than 2 moles based on 1 mole of the diamine compound, the weight average molecular weight of the obtained polymer is too large, which may lead to poor solubility of the polymer in the organic solvent. On the other hand, when the bismaleimide compound is used in an amount less than 1 mole based on 1 mole of the diamine compound, the weight average molecular weight of the obtained polymer is too small, which may lead to poor heat resistance of a liquid crystal alignment film made therefrom.

The polymerization for obtaining the polymer is conducted generally at a temperature from 0° C. to 180° C., preferably at a temperature from 80° C. to 120° C. The weight average molecular weight of the polymer can be adjusted by controlling the temperature and the period for the polymerization.

There is not specific limitation to the organic solvent for the polymerization. Examples of the suitable organic solvent include aprotic polar solvents, such as N-methyl-2-pyrrolidone, N,N-dimethylacetamide, N,N-dimethylformamide, dimethylsulfoxide, γ-butyrolactone, tetramethylurea, hexamethylphosphoric acid triamide, and the like; and phenolic solvents, such as meta-cresol, xylenol, phenol, halogenated phenols, and the like.

The aforementioned organic solvents can be used in combination with a poor solvent, such as alcohols, ketones, esters, ethers, halogenated hydrocarbon compounds, hydrocarbon compounds, and the like in such an amount that does not cause precipitation of the formed polymer. Examples of the poor solvent include methyl alcohol, ethyl alcohol, isopropylalcohol, cyclohexanol, ethylene glycol, propylene glycol, 1,4-butanediol, triethylene glycol, acetone, methyl ethyl ketone, methyl isobutyl ketone, cyclohexanone, methyl acetate, ethyl acetate, butyl acetate, diethyl oxalate, diethylmalonate, diethyl ether, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene, or the like.

The reaction solution containing the obtained polymer is treated by pouring the reaction solution into a large amount of poor solvent to obtain a precipitate, which is then dried under a reduced pressure to obtain the polymer. Alternatively, the polymer can be obtained by a treatment of distilling the reaction solution under a reduced pressure in a distillator. The polymer can be refined by repeating the treatment.

Diamine Compound:

The diamine compounds used in the present invention include aliphatic or alicyclic diamine compounds, aromatic diamine compounds, or other diamine compounds.

Examples of aliphatic or alicyclic diamine compounds include 1,3-diaminopropane, 1,4-diaminobutane, 1,5-diaminopentane, 1,6-diaminohexane, 1,7-diaminoheptane, 1,8-diaminooctane, 1,9-diaminononane, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclic[6·2·1·0$^{2,7}$]-undecylenedimethylenediamine, and 4,4'-methylenebis(cyclohexylamine).

Examples of aromatic diamine compounds include p-phenylenediamine, m-phenylenediamine, o-phenylenediamine, 4,4'-diaminodiphenylmethane, 4,4'-diaminodiphenylethane, 4,4'-diaminodiphenylsulfide, 4,4'-diaminodiphenylsulfone, 3,3'-dimethyl-4,4'-diaminobiphenyl, 4,4'-diaminobenzanilide, 4,4'-diaminodiphenylether, 1,5-diaminonaphthalene, 2,2'-dimethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracen, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-diamino-2,2'-bis(trifluoromethyl)biphenyl, and 4,4'-bis[(4-amino-2-trifluoromethyl)phenoxy]octafluoro obiphenyl.

Examples of other diamine compounds include 2,3-diaminopyridine, 2,6-diaminopyridine, 3,4-diaminopyridine, 2,4-diaminopyrimidine, 5,6-diamino-2,3-dicyanopyrazine, 5,6-diamino-2,4-dihydroxypyrimidine, 2,4-diamino-6-dimethylamino-1,3,5-triazine, 1,4-bis(3-aminopropyl)piperazine, 2,4-diamino-6-isopropoxy-1,3,5-triazine, 2,4-diamino-6-methoxy-1,3,5-triazine, 2,4-diamino-6-phenyl-1,3,5-triazine, 2,4-diamino-6-methyl-s-triazine, 2,4-diamino-1,3,5-triazine, 4,6-diamino-2-vinyl-s-triazine, 2,4-diamino-5-phenylthiazole, 2,6-diaminopurine, 5,6-diamino-1,3-dimethyluracil, 3,5-diamino-1,2,4-triazole, 6,9-diamino-2-ethoxyacridine lactate, 3,8-diamino-6-phenylphenanthridine, 1,4-diaminopiperazine, 3,6-diaminoacridine, and bis(4-aminophenyl)phenylamine.

In addition to the aforesaid examples of the diamine compound, the diamine compound useful for the present invention preferably includes the compounds represented by the following formulas (I-1) and (I-2) (i.e., diamines having two primary amino groups and a nitrogen atom other than the primary amino group in the molecule):

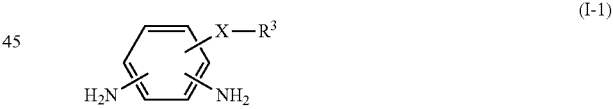

(I-1)

wherein, $R^3$ is a monovalent organic group having a ring structure containing a nitrogen atom selected from the group consisting of pyridine, pyrimidine, triazine, piperidine and piperazine; and X is a divalent organic group,

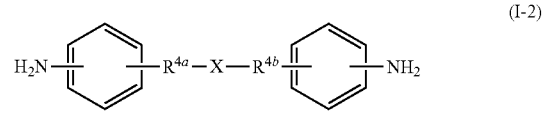

(I-2)

wherein, $R^{4a}$ and $R^{4b}$ are independently a divalent organic group having a ring structure containing a nitrogen atom selected from the group consisting of pyridine, pyrimidine, triazine, piperidine and piperazine; and X is a divalent organic group, the compounds represented by the following formulas (I-3)~(I-5)

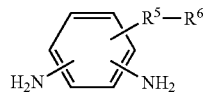 (I-3)

wherein, $R^5$ is a divalent organic group selected from the group consisting of —O—, —COO—, —OCO—, —NHCO—, —CONH— and —CO—; $R^6$ is a monovalent organic group having a group selected from the group consisting of a steroid skeleton, a trifluoromethyl group, and a fluoro group, or an alkyl group having 6 to 30 carbon atoms,

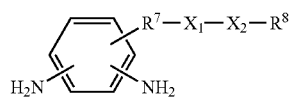 (I-4)

wherein, $R^7$ is a divalent organic group selected from the group consisting of —O—, —COO—, —OCO—, —NHCO—, —CONH—, and —CO—; $X_1$ and $X_2$ are independently a divalent organic group selected from the group consisting of an alicyclic group, an aromatic group, and a heterocyclic group; $R^8$ is selected from the group consisting of an alkyl group having 3 to 18 carbon atoms, an alkoxy group having 3 to 18 carbon atoms, a fluoroalkyl group having 1 to 5 carbon atoms, a fluoroalkoxy group having 1 to 5 carbon atoms, a cyano group, and halogen atoms,

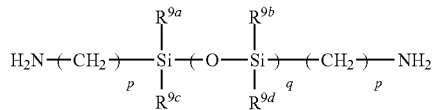 (I-5)

wherein, $R^{9a}$, $R^{9b}$, $R^{9c}$, $R^{9d}$ are independently a hydrocarbon group having 1 to 12 carbon atoms, p is an integer ranging from 1 to 3, and q is an integer ranging from 1 to 20, and the diamine compounds represented by the following formulas (1)-(7),

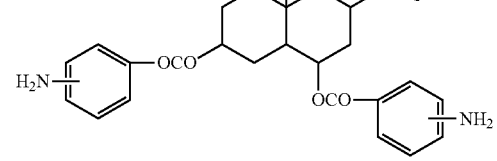 (1)

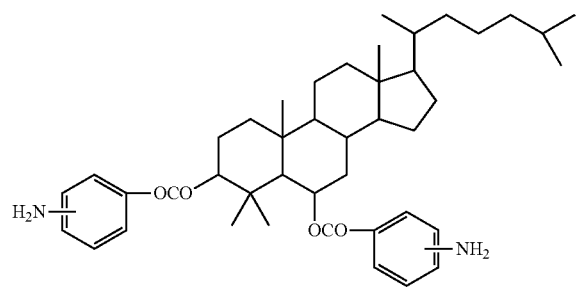 (2)

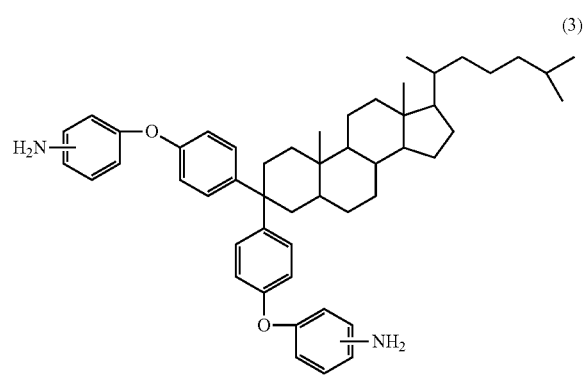 (3)

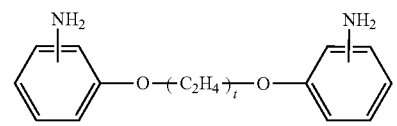 (4)

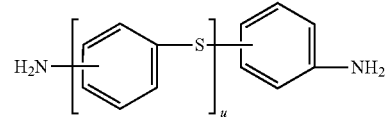 (5)

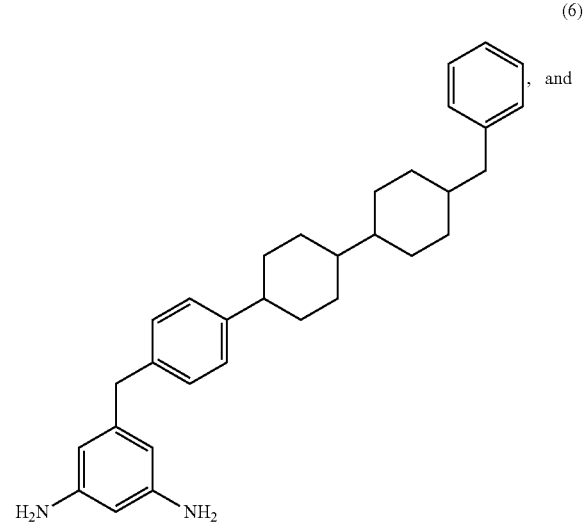 (6), and

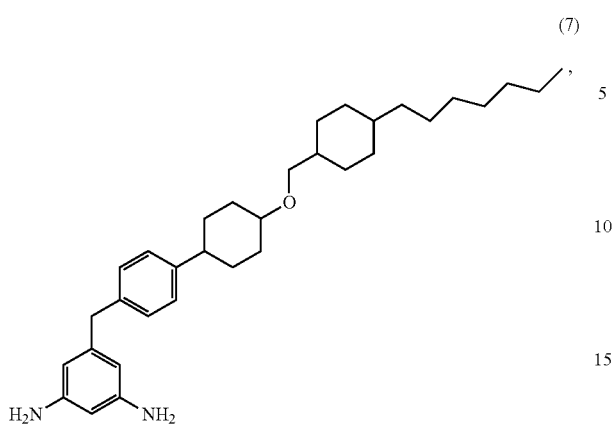
(7)

wherein, t is an integer ranging from 2 to 12, and u is an integer ranging from 1 to 5.

These diamine compounds may be used alone or in admixture of two or more.

The compound represented by the formula (8) below is taken as an example from the compounds represented by the aforementioned formula (I-1). The compound represented by the formula (9) below is taken as an example from the compounds represented by the aforementioned formula (I-2). The compounds represented by the formulas (10)~(21) below are taken as examples from the compounds represented by the aforementioned formula (I-3). The liquid crystalline diamine compounds represented by the formulas (22)~(33) below are taken as examples from the compounds represented by the aforementioned formula (I-4).

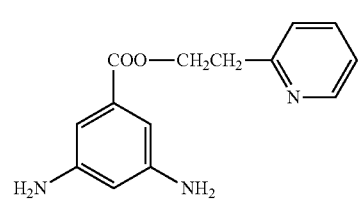
(8)

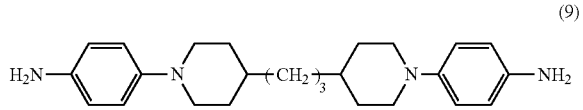
(9)

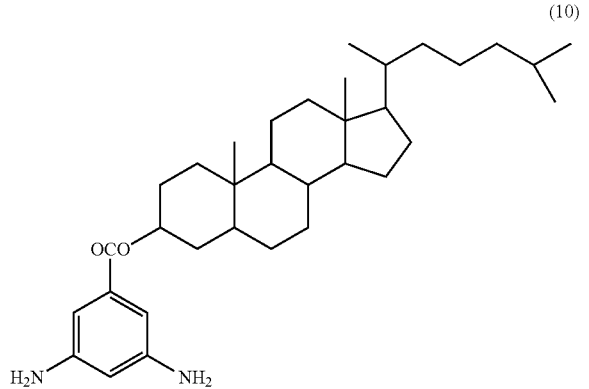
(10)

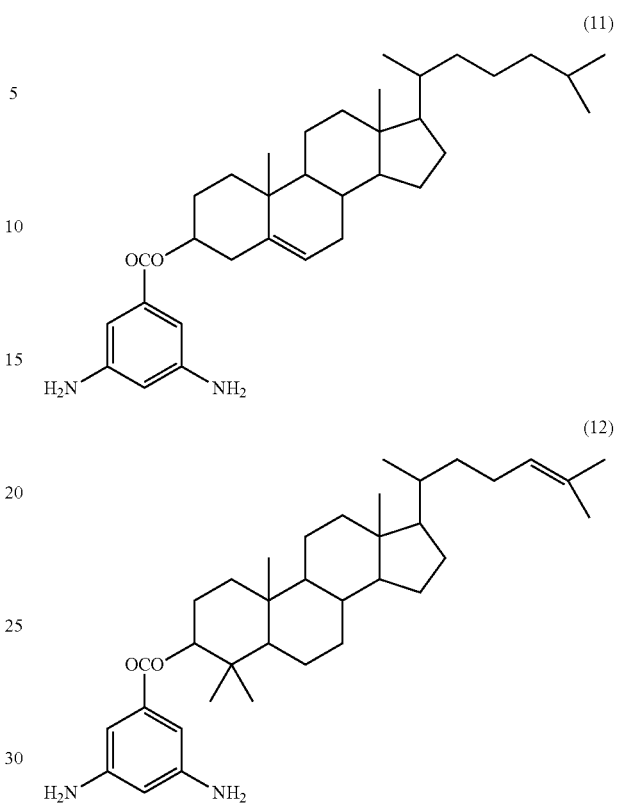
(11)

(12)

(13)

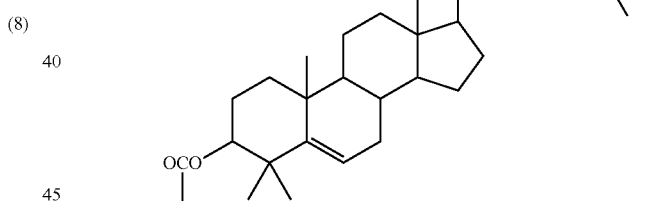
(14)

(15)

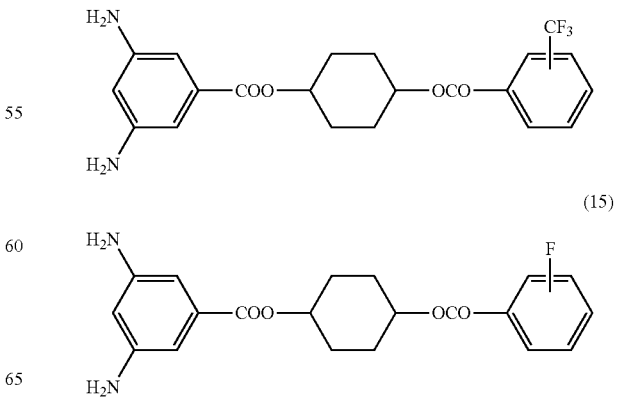

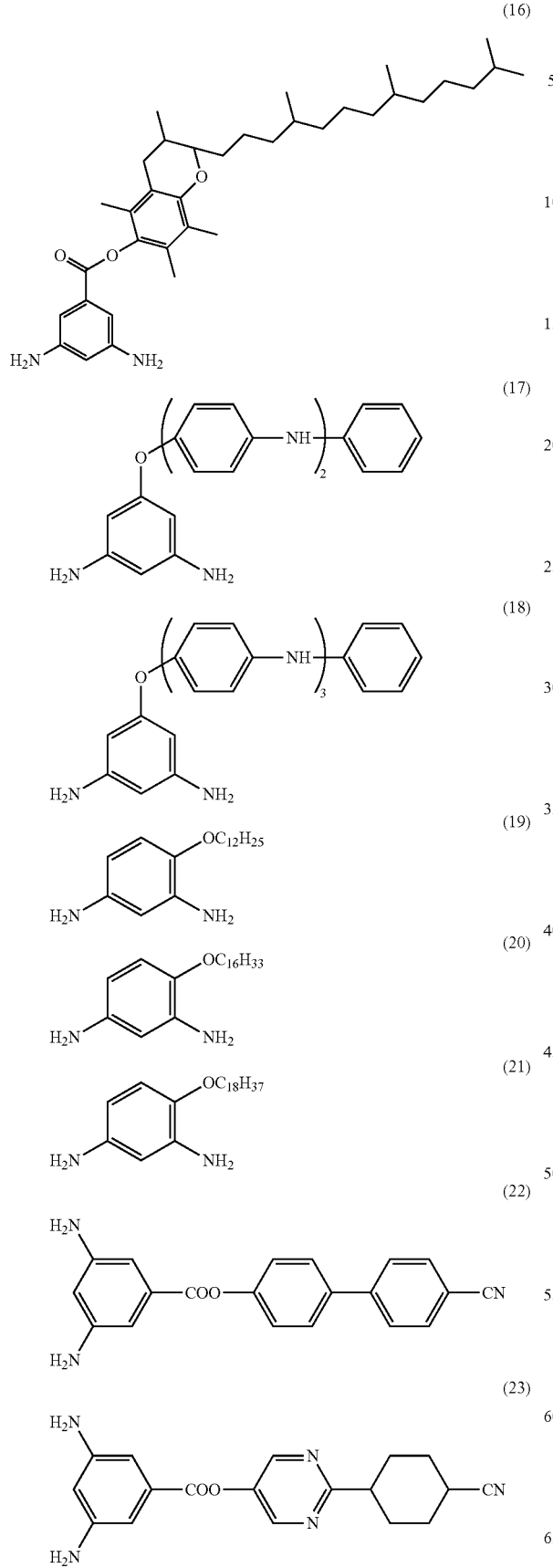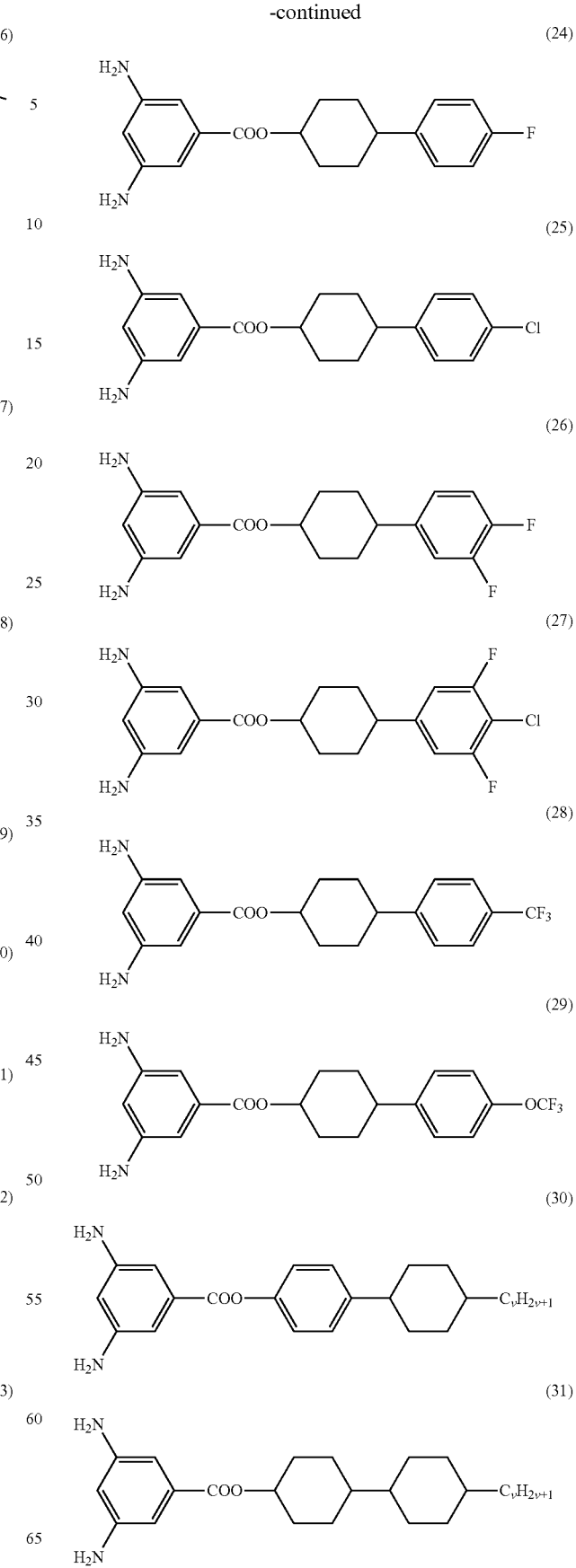

-continued (32)

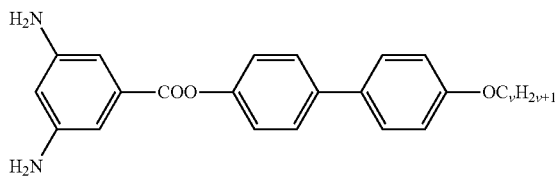

(33)

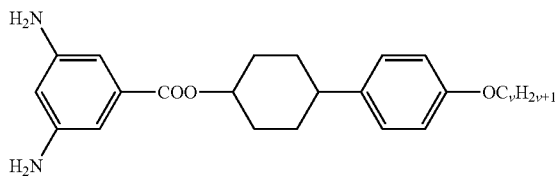

wherein, v is an integer ranging from 3 to 12.

The total used amount of the diamine compounds represented by formulas (I-1)~(I-5) and by formulas (1)~(7) is generally from 1 to 100 mole %, preferably from 3 to 100 mole %, and more preferably from 5 to 100 mole %, based on 100 mole % of all of the diamine compounds.

When the total used amount of the diamine compounds represented by formulas (I-1)~(I-5) and by formulas (1)~(7) is from 1 to 100 mole % based on 100 mole % of all of the diamine compounds, the liquid crystal alignment agent produced there by has good storage stability, and the liquid crystal alignment film made from the liquid crystal alignment agent has improved alignment properties in terms of pretilt angle and image sticking.

Bismaleimide Compound:

There is no specific limitation to the production method for the bismaleimide compound. The bismaleimide compound is generally synthesized by reacting a maleic anhydride derivative with a diamine compound in an organic solvent, followed by conducting an imidization treatment.

Examples of the maleic anhydride derivative include maleic anhydride, 2,3-dimethylmaleic anhydride, 2-methylmaleic anhydride, 2,3-diethylmaleic anhydride, 2-ethylmaleic anhydride, or the like. Maleic anhydride is preferred.

Examples of the diamine compound suitable for the production of the bismaleimide compound are the same as those of the aforesaid diamine compound.

In the method for producing the bismaleimide compound, the maleic anhydride derivative and the diamine compound are used in amounts such that the molar ratio of the anhydride group of the maleic anhydride derivative to the amino group of the diamine compound ranges generally from 1.0 to 2.5, preferably from 1.0 to 2.0, and more preferably from 1.0 to 1.8.

The temperature for the reaction of the maleic anhydride derivative with the diamine compound in the organic solvent ranges generally from 0° C. to 100° C., preferably from 0° C. to 80° C., and more preferably from 0° C. to 70° C. The reaction period ranges generally from 1 to 5 hours, and preferably from 2 to 4 hours.

The imidization treatment is carried out, for example, by conducting a dehydration/ring-closure reaction in the presence of an acidic catalyst. The temperature for the imidization treatment ranges generally from 40° C. to 200° C., and preferably from 80° C. to 150° C. Examples of the acidic catalyst suitable for the imidization treatment include phosphoric acid, acetic acid, propionic acid, trifluoroacetic acid, p-toluenesulfonic acid, or the like.

There is no specific limitation to the organic solvent for the production of the bismaleimide compound. Examples of the organic solvent include pentane, hexane, heptane, cyclohexane, benzene, toluene, xylene, ethylbenzene, dichloromethane, trichloromethane, tetrachloromethane, dichloroethane, tetrahydrofuran, dioxane, N,N-dimethylformamide, N,N-dimethylacetamide, N-methyl-2-pyrrolidone, dimethylsulfoxide, or the like.

Examples of the bismaleimide compound useful in the present invention include N,N'-m-phenylenebismaleimide, N,N'-p-phenylenebismaleimide, N,N'-m-xylenebismaleimide, N,N'-p-xylenebismaleimide, N,N'-2,4-tolylenebismaleimide, N,N-2,6-tolylenebismaleimide, 1,3-bis(3-maleimidophenoxy)benzene, 1,3-bis(4-maleimidophenoxy)benzene, 1,3-bis[3-(3-maleimidophenoxy)phenoxy]benzene, 1,3-bis{3-[3-(3-maleimidophenoxy)phenoxy]phenoxy}benzene, 1,3-bis{1-[4-(3-maleimidophenoxy)phenyl]-1-methylethyl}benzene, 1,3-bis{1-[4-(4-maleimidophenoxy)phenyl]-1-methylethyl}benzene, 1,4-bis{1-[4-(4-maleimidophenoxy)phenyl]-1-methylethyl}benzene, N,N'-3,3'-biphenylenebismaleimide, N,N'-4,4'-biphenylenebismaleimide, N,N'-4,4'-(3,3'-dimethylbiphenylene)bismaleimide, 4,4'-bis(3-maleimidophenoxy)biphenyl, 4,4'-bis(4-maleimidophenoxy)biphenyl, N,N'-3,3'-diphenylmethanebismaleimide, N,N'-4,4'-diphenylmethanebismaleimide, N,N'-diphenylethanebismaleimide, bis[4-(3-maleimidophenoxy)phenyl]methane, bis[4-(4-maleimidophenoxy)phenyl]methane, N,N'-[4,4'-bis(3-methylphenyl)methane]bismaleimide, N,N'-[4,4'-bis(3-methoxyphenyl)methane]bismaleimide, N,N'-[4,4'-bis(3-ethylphenyl)methane]bismaleimide, N,N'-[4,4'-bis(3,5-dimethylphenyl)methane]bismaleimide, N,N'-[4,4'-bis(3,5-diethylphenyl)methane]bismaleimide, N,N'-[4,4'-bis(3-methyl-5-ethylphenyl)methane]bismaleimide, N,N'-[4,4'-bis(3-ethyl-5-methylphenyl)methane]bismaleimide, N,N'-[4,4'-bis(3,5-diisopropylphenyl)methane]bismaleimide, N,N'-[4,4'-bis(3-chlorophenyl)methane]bismaleimide, N,N'-diphenylpropanebismaleimide, 2,2-bis[4-(3-maleimidophenoxy)phenyl]propane, 2,2-bis[4-(4-maleimidophenoxy)phenyl]propane, 2,2-bis[4-(3-maleimidophenoxy)phenyl]butane, 2,2-bis[4-(4-maleimidophenoxy)phenyl]butane, 2,2-bis[4-(3-maleimidophenoxy)phenyl]hexafluoropropane, 2,2-bis[4-(4-maleimidophenoxy)phenyl]hexafluoropropane, 2,2-bis[3-chloro-4-(4-maleimidophenoxy)phenyl]propane, 2,2-bis[3-bromo-4-(4-maleimidophenoxy)phenyl]propane, 2,2-bis[3-methyl-4-(4-maleimidophenoxy)phenyl]propane, 2,2-bis[3-methyl-4-(4-maleimidophenoxy)phenyl]hexafluoropropane, 2,2-bis[3-ethyl-4-(4-maleimidophenoxy)phenyl]propane, 2,2-bis[3-ethyl-4-(4-maleimidophenoxy)phenyl]hexafluoropropane, 2,2-bis[3-propyl-4-(4-maleimidophenoxy)phenyl]propane, 2,2-bis[3-isopropyl-4-(4-maleimidophenoxy)phenyl]propane, 2,2-bis[3-butyl-4-(4-maleimidophenoxy)phenyl]propane, 2,2-bis[3-t-butyl-4-(4-maleimidophenoxy)phenyl]propane, 2,2-bis[3-s-butyl-4-(4-maleimidophenoxy)phenyl]propane, 2,2-bis[3-methoxy-4-(4-maleimidophenoxy)phenyl]propane, 2,2-bis[3,5-dimethyl-4-(4-maleimidophenoxy)phenyl]propane, 2,2-bis[3,5-dimethyl-4-(4-maleimidophenoxy)phenyl]hexafluoropropane, 2,2-bis[3,5-dibromo-4-(4-maleimidophenoxy)phenyl]hexafluoropropane, 2,2-bis[4-{1-[4-(4-maleimidophenoxy)phenyl]-1-methylethyl]phenyl}propane, N,N'-3,3'-diphenyletherbismaleimide, N,N'-4,4'-diphenyletherbismaleimide, bis[3-(3-maleimidophenoxy)phenyl]ether, bis[4-(3-maleimidophenoxy)phenyl]ether, bis[4-(4-maleimidophenoxy)phenyl]ether, bis{3-

[3-(3-maleimidophenoxy)phenoxy]phenyl}ether, bis(3-maleimidophenyl)ketone, bis(4-maleimidophenyl)ketone, bis[4-(3-maleimidophenoxy)phenyl]ketone, bis[4-(4-maleimidophenoxy)phenyl]ketone, bis(3-maleimidophenyl)sulfide, bis(4-maleimidophenyl)sulfide, bis[4-(3-maleimidophenoxy)phenyl]sulfide, bis[4-(4-maleimidophenoxy)phenyl]sulfide, bis[4-(3-maleimidophenoxy)phenyl]sulfoxide, bis[4-(4-maleimidophenoxy)phenyl]sulfoxide, bis(3-maleimidophenyl)sulfone, bis(4-maleimidophenyl)sulfone, bis[4-(3-maleimidophenoxy)phenyl]sulfone, bis[4-(4-maleimidophenoxy)phenyl]sulfone, bis[3-methyl-4-(4-maleimidophenoxy)phenyl]methane, bis[3,5-dimethyl-4-(4-maleimidophenoxy)phenyl]methane, bis[3-ethyl-4-(4-maleimidophenoxy)phenyl]methane, 1,1-bis[4-(3-maleimidophenoxy)phenyl]ethane, 1,1-bis[4-(4-maleimidophenoxy)phenyl]ethane, 1,2-bis[4-(3-maleimidophenoxy)phenyl]ethane, 1,2-bis[4-(4-maleimidophenoxy)phenyl]ethane, 1,1-bis[3-methyl-4-(4-maleimidophenoxy)phenyl]ethane, 1,1-bis[3-chloro-4-(4-maleimidophenoxy)phenyl]ethane, 1,1-bis[3-bromo-4-(4-maleimidophenoxy)phenyl]ethane, 3,3-bis[4-(4-maleimidophenoxy)phenyl]pentane, N,N'-ethylenebismaleimide, N,N'-trimethylenebismaleimide, N,N'-tetramethylenebismaleimide, N,N'-pentamethylenebismaleimide, N,N'-hexamethylenebismaleimide, N,N'-heptamethylenebismaleimide, N,N'-octamethylenebismaleimide, N,N-decamethylenebismaleimide, N,N'-dodecamethylenebismaleimide, N,N'-(4,4'-dicyclohexylmethane)bismaleimide, N,N'-(1,3-dimethylenecyclohexane)bismaleimide, N,N'-(1,4-dimethylenecyclohexane)bismaleimide, or the like.

Among the aforesaid bismaleimide compounds, N,N'-m-phenylenebismaleimide, N,N'-p-phenylenebismaleimide, N,N'-3,3'-diphenylmethanebismaleimide, N,N'-4,4'-diphenylmethanebismaleimide, N,N'-[4,4'-bis(3-ethylphenyl)methane]bismaleimide, N,N'-[4,4'-bis(3,5-dimethylphenyl)methane]bismaleimide, N,N'-[4,4'-bis(3,5-diethylphenyl)methane]bismaleimide, N,N'-[4,4'-bis(3-methyl-5-ethylphenyl)methane]bismaleimide, N,N'-[4,4'-bis(3-ethyl-5-methylphenyl)methane]bismaleimide, N,N'-[4,4'-bis(3,5-diisopropylphenyl)methane]bismaleimide, bis[3-methyl-4-(4-maleimidophenoxy)phenyl]methane, bis[3,5-dimethyl-4-(4-maleimidophenoxy)phenyl]methane, bis[3-ethyl-4-(4-maleimidophenoxy)phenyl]methane, 2,2-bis[4-(3-maleimidophenoxy)phenyl]hexafluoropropane, 2,2-bis[4-(4-maleimidophenoxy)phenyl]hexafluoropropane, 2,2-bis[3-ethyl-4-(4-maleimidophenoxy)phenyl]hexafluoropropane, and 2,2-bis[3,5-dimethyl-4-(4-maleimidophenoxy)phenyl]hexafluoropropane are preferred.

Organic Solvents:

Examples of the organic solvents useful in the liquid crystal alignment agent of the present invention include N-methyl-2-pyrrolidone, γ-butyrolactone, γ-butyrolactam, N,N-dimethylformamide, N,N-dimethylacetamide, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether (i.e., butyl cellosolve), ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, or the like.

The organic solvent is used in an amount generally from 400 to 10,000 parts by weight, preferably from 500 to 5,000 parts by weight, and more preferably from 700 to 3,000 parts by weight, based on 100 parts by weight of the polymer.

Additives:

The additives such as functional silane containing compounds or epoxy group containing compounds may be added to the liquid crystal alignment agent of the present invention so as to improve adhesion of the liquid crystal alignment agent to the substrate and abrasion resistance of the liquid crystal alignment agent to be applied as long as the intended properties of the liquid crystal alignment agent are not impaired.

Examples of the functional silane containing compounds include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, or the like.

Examples of the epoxy group containing compounds include ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, 2,2-dibromo-neopentyl glycol diglycidyl ether, 1,3,5,6-tetragylcidyl-2,4-hexanediol, N,N,N',N'-tetragylcidyl-m-xylenediamine, 1,3-bis(N,N-digylcidylaminomethyl)cyclohexane, N,N,N',N'-tetragylcidyl-4,4'-diaminodiphenylmethane, 3-(N-allyl-N-glycidyl)aminopropyltrimethoxysilane, 3-(N,N-diglycidyl)aminopropyltrimethoxysilane, or the like.

Formulation of Liquid Crystal Alignment Agent:

The liquid crystal alignment agent of the present invention is obtained by dissolving the polymer and the optional additives in the organic solvent.

The temperature for formulating the liquid crystal alignment agent of the present invention preferably ranges from 0 to 100° C., and more preferably from 20 to 60° C.

The liquid crystal alignment agent of the present invention has a viscosity in the range generally from 5 to 40 cps at 25° C., preferably from 8 to 35 cps, and more preferably from 10 to 30 cps.

When the viscosity of the liquid crystal alignment agent is less than 5 cps, film-forming ability of the liquid crystal alignment agent is unsatisfactory, which in turn results in the image sticking problem of the liquid crystal alignment film made therefrom. On the other hand, when the viscosity of the liquid crystal alignment is more than 40 cps, the storage stability of the liquid crystal alignment agent is unsatisfactory, and the liquid crystal alignment film made therefrom has too large thickness and defect of pinholes.

Formation of a Liquid Crystal Alignment Film:

The liquid crystal alignment agent of the present invention is applied to one side of a substrate having a transparent conductive film by a roller coating method, a spinner coating method, a printing method, an ink-jet method, or the like, and is then heated to form a coating film.

Examples of the substrate suitable for the present invention include alkali-free glass, soda-lime glass, hard glass (Pyrex glass), quartz glass, and the like commonly used in liquid crystal display devices; or a transparent plastic substrate made of polyethylene terephthalate, polybutylene terephthalate, polyether sulphone, polycarbonate, or the like. The transparent conductive film formed on one side of the substrate may be a NESA® film (NESA® is the registered trademark of USA PPG Corporation) made of tin oxide ($SnO_2$), or an ITO (indium tin oxide) film made of indium oxide-tin oxide ($In_2O_3$—$SnO_2$) or the like.

Before the application of the liquid crystal alignment agent, in order to improve the adhesion of the coating film to the substrate and the transparent conductive film, a functional silane-containing compound or a functional titanium-containing compound may be applied to the surface of the substrate.

The heating process to form the liquid crystal alignment film comprises pre-bake and post-bake treatments after coating the liquid crystal alignment agent. The pre-bake treatment causes the organic solvent to volatilize and form a coating film. Temperature for the pre-bake treatment is generally from 30 to 120° C., preferably from 40 to 110° C., and more preferably from 50 to 100° C.

In addition, after the coating film is formed, the post-bake treatment is further carried out to form a stabilized coating film. Temperature for the post-bake treatment is generally from 150 to 300° C., preferably from 180 to 280° C., and more preferably from 200 and 250° C.

A film thickness of the formed coating film is preferably from 0.001 to 1 μm, and more preferably from 0.005 to 0.5 μm.

The formed coating film is rubbed in a certain direction with a roller wound with a cloth made of nylon, rayon, or cotton fiber according to the requirements. Accordingly, the alignability of the liquid crystal molecules is provided to the formed coating film to become a liquid crystal alignment film. Moreover, the methods for providing the alignability of the liquid crystal molecules by forming protrusions or patterns on at least one substrate are widely known as MVA (Multi-domain Vertical Alignment) or PVA (Patterned Vertical Alignment) methods.

Liquid Crystal Display Element:

Two substrates each having the aforementioned liquid crystal alignment film formed thereon are prepared and arranged to oppose each other with a space (cell gap). The peripheral portions of the two substrates are joined together with a sealing agent, liquid crystals are filled into the cell gap defined by the surfaces of the substrates and the sealing agent, and an injection hole is sealed up to form a liquid crystal cell. Then, a polarizer is affixed to the exterior sides of the liquid crystal cell (i.e., the other sides of the substrates forming the liquid crystal cell) to obtain the liquid crystal display element.

The sealing agent may be a general epoxy resin hardening agent, and spacer material may be glass beads, plastic beads, photosensitive epoxy resin, or the like. Examples of liquid crystals include nematic liquid crystals, for example, Schiff base liquid crystals, azoxy liquid crystals, biphenyl liquid crystals, phenylcyclohexane liquid crystals, ester liquid crystals, terphenyl liquid crystals, biphenylcyclohexane liquid crystals, pyrimidine liquid crystals, dioxane liquid crystals, bicyclooctane liquid crystals, cubane liquid crystals, or the like. Cholesterol liquid crystals, such as cholesteryl chloride, cholesteryl nonanoate, cholesteryl carbonate, or the like, and chiral agents sold under the trade names C-15, CB-15 (manufactured by Merck Company) may be added to the above liquid crystals. In addition, the polarizer affixed to the exterior sides of the liquid crystal cell may be, for example, a polarizer comprising cellulose acetate protective films sandwiching the polarizing film called "H film" which has absorbed iodine while a polyvinyl alcohol is stretched and aligned, or a polarizer composed of the H film itself.

EXAMPLES

The following examples are provided to illustrate the preferred embodiments of the invention, and should not be construed as limiting the scope of the invention.

The compound having the aforementioned formula (7) used in the following examples is made according to the method disclosed in JP 2003-96034, and is referred to as C7CDA hereinafter. The compound having the aforementioned formula (6) used in the following examples is made according to the method disclosed in JP 2002-162630, and is referred to as BCDA hereinafter.

Synthesis of Polymer

Synthesis Example 1

A 500 ml four-necked conical flask equipped with a nitrogen inlet, a stirrer, a heater, a condenser and a thermometer was purged with nitrogen, and was added with N,N'-4,4'-diphenylmethanebismaleimide (referred to as DPM-BMI hereinafter, 8.96 g, 0.025 mole) and N-methyl-2-pyrrolidone (referred as to NMP hereinafter, 50 g). Stirring was conducted at room temperature (23-25° C.) until DPM-BMI was dissolved in NMP. P-phenylenediamine (referred to as PDA hereinafter, 2.57 g, 0.02375 mole), C7CDA (0.61 g, 0.00125 mole), glacial acetic acid (5 g), and NMP (27 g) were then added, and reaction was conducted for 24 hours at 100° C. The reaction solution was then poured into methanol (1500 ml) to precipitate a polymer. The polymer obtained after filtering was dried in a vacuum oven at 60° C. to obtain a polymer (A-1-1).

Synthesis Example 2

A 500 ml four-necked conical flask equipped with a nitrogen inlet, a stirrer, a heater, a condenser and a thermometer was purged with nitrogen, and was added with N,N'-m-phenylenebismaleimide (referred to as P-BMI hereinafter, 6.71 g, 0.025 mole) and NMP (50 g). Stirring was conducted at room temperature until P-BMI was dissolved in NMP. 4,4'-diaminodiphenylmethane (referred to as DDM hereinafter, 3.97 g, 0.02 mole), BCDA (2.26 g, 0.005 mole), glacial acetic acid (5 g), and NMP (27 g) were then added, and reaction was conducted for 24 hours at 100° C. The reaction solution was then poured into methanol (1500 ml) to precipitate a polymer. The polymer obtained after filtering was dried in a vacuum oven at 60° C. to obtain a polymer (A-1-2).

Synthesis Example 3

A 500 ml four-necked conical flask equipped with a nitrogen inlet, a stirrer, a heater, a condenser and a thermometer was purged with nitrogen, and was added with DPM-BMI (8.96 g, 0.025 mole) and NMP (50 g). Stirring was conducted at room temperature until DPM-BMI was dissolved in NMP. 4,4'-diaminodiphenylether (referred to as ODA hereinafter, 4.00 g, 0.02 mole), a compound having the aforementioned formula (16) (referred as to VEDA hereinafter, 2.82 g, 0.005 mole), glacial acetic acid (5 g), and NMP (27 g) were then added, and reaction was conducted for 24 hours at 100° C. The reaction solution was then poured into methanol (1500 ml) to precipitate a polymer. The polymer obtained after filtering was dried in a vacuum oven at 60° C. to obtain a polymer (A-1-3).

Synthesis Example 4

A 500 ml four-necked conical flask equipped with a nitrogen inlet, a stirrer, a heater, a condenser and a thermometer was purged with nitrogen, and was added with DPM-BMI (13.62 g, 0.038 mole) and NMP (50 g). Stirring was conducted at room temperature until DPM-BMI was dissolved in NMP. PDA (2.57 g, 0.02375 mole), C7CDA (0.61 g, 0.00125 mole), glacial acetic acid (5 g), and NMP (27 g) were then added, and reaction was conducted for 36 hours at 100° C. The reaction solution was then poured into methanol (1500 ml) to precipitate a polymer. The polymer obtained after filtering was dried in a vacuum oven at 60° C. to obtain a polymer (A-1-4).

Synthesis Example 5

A 500 ml four-necked conical flask equipped with a nitrogen inlet, a stirrer, a heater, a condenser and a thermometer was purged with nitrogen, and was added with P-BMI (6.71 g, 0.025 mole) and NMP (50 g). Stirring was conducted at room temperature until P-BMI was dissolved in NMP. DDM (4.16 g, 0.021 mole), BCDA (2.49 g, 0.0055 mole), glacial acetic acid (5 g), and NMP (27 g) were then added, and reaction was conducted for 24 hours at 100° C. The reaction solution was then poured into methanol (1500 ml) to precipitate a polymer. The polymer obtained after filtering was dried in a vacuum oven at 60° C. to obtain a polymer (A-1-5).

Synthesis Example 6

A 500 ml four-necked conical flask equipped with a nitrogen inlet, a stirrer, a heater, a condenser and a thermometer was purged with nitrogen, and was added with DPM-BMI (8.96 g, 0.025 mole) and NMP (50 g). Stirring was conducted at room temperature until DPM-BMI was dissolved in NMP. ODA (4.00 g, 0.02 mole), VEDA (2.82 g, 0.005 mole), glacial acetic acid (5 g), and NMP (27 g) were then added, and reaction was conducted for 6 hours at 100° C. The reaction solution was then poured into methanol (1500 ml) to precipitate a polymer. The polymer obtained after filtering was dried in a vacuum oven at 60° C. to obtain a polymer (A-1-6).

Comparative Synthesis Example 1

A 500 ml four-necked conical flask equipped with a nitrogen inlet, a stirrer, a heater, a condenser and a thermometer was purged with nitrogen, and was added with DPM-BMI (8.96 g, 0.025 mole) and NMP (50 g). Stirring was conducted at room temperature until DPM-BMI was dissolved in NMP. PDA (5.14 g, 0.0475 mole), C7CDA (1.23 g, 0.0025 mole), glacial acetic acid (5 g), and NMP (27 g) were then added, and reaction was conducted for 24 hours at 100° C. The reaction solution was then poured into methanol (1500 ml) to precipitate a polymer. The polymer obtained after filtering was dried in a vacuum oven at 60° C. to obtain a polymer (A-2-1).

Comparative Synthesis Example 2

A 500 ml four-necked conical flask equipped with a nitrogen inlet, a stirrer, a heater, a condenser and a thermometer was purged with nitrogen, and was added with DPM-BMI (26.88 g, 0.075 mole) and NMP (50 g). Stirring was conducted at room temperature until DPM-BMI was dissolved in NMP. PDA (2.16 g, 0.02 mole), BCDA (2.26 g, 0.005 mole), glacial acetic acid (5 g), and NMP (27 g) were then added, and reaction was conducted for 48 hours at 100° C. The reaction solution was then poured into methanol (1500 ml) to precipitate a polymer. The polymer obtained after filtering was dried in a vacuum oven at 60° C. to obtain a polymer (A-2-2).

Comparative Synthesis Example 3

A 500 ml four-necked conical flask equipped with a nitrogen inlet, a stirrer, a heater, a condenser and a thermometer was purged with nitrogen, and was added with DPM-BMI (26.88 g, 0.075 mole) and m-cresol (167 g). Stirring was conducted at room temperature until DPM-BMI was dissolved in m-cresol. DDM (14.87 g, 0.075 mole) and acetic acid (0.75 ml) were then added, and reaction was conducted for 48 hours at 100° C. The reaction solution was then poured into methanol to precipitate a polymer. The polymer obtained after filtering was dried in a vacuum oven at 60° C. to obtain a polymer (P-A-1).

Another 500 ml four-necked conical flask equipped with a nitrogen inlet, a stirrer, a heater, a condenser and a thermometer was purged with nitrogen, and was added with the obtained polymer (P-A-1) (10 g) and NMP (175 g). Stirring was conducted at room temperature until the polymer (P-A-1) was dissolved in NMP. The temperature was lowered to below 5° C. Triethylamine (5.3 g) and lauroyl chloride (9.45 g) were then added, and reaction was conducted for 24 hours. The reaction solution was then poured into methanol to precipitate a polymer. The polymer obtained after filtering was dried in a vacuum oven at 60° C. to obtain a polymer (A-2-3).

Comparative Synthesis Example 4

A 500 ml four-necked conical flask equipped with a nitrogen inlet, a stirrer, a heater, a condenser and a thermometer was purged with nitrogen, and was added with 2,2-bis[4-(4-maleimidophenoxy)phenyl]propane (28.53 g, 0.05 mole) and m-cresol (150 g). Stirring was conducted at room temperature until 2,2-bis[4-(4-maleimidophenoxy)phenyl]propane was dissolved in m-cresol. Octylamine (6.46 g, 0.05 mole) and acetic acid (0.7 g) were then added, and reaction was conducted for 30 hours at 100° C. The reaction solution was then poured into methanol to precipitate a polymer. The polymer obtained after filtering was dried in a vacuum oven at 60° C. to obtain a polymer (A-2-4).

Comparative Synthesis Example 5

A 500 ml four-necked conical flask equipped with a nitrogen inlet, a stirrer, a heater, a condenser and a thermometer was purged with nitrogen, and was added with VEDA (2.82 g, 0.005 mole), PDA (4.87 g, 0.045 mole), and NMP (80 g). Stirring was conducted at room temperature until VEDA and PDA were dissolved in NMP. Pyromellitic dianhydride (referred to as PMDA hereinafter, 10.91 g, 0.05 mole) and NMP (20 g) were then added, and reaction was conducted for 2 hours at room temperature. The reaction solution was then poured into water (1500 ml) to precipitate a polymer. The polymer obtained after filtering was dried in a vacuum oven at 60° C. to obtain a polyamic acid polymer (A-2-5).

Comparative Synthesis Example 6

A 500 ml four-necked conical flask equipped with a nitrogen inlet, a stirrer, a heater, a condenser and a thermometer was purged with nitrogen, and was added with VEDA (5.64 g, 0.01 mole), PDA (4.33 g, 0.04 mole), and NMP (68 g). Stirring was conducted at 60° C. until VEDA and PDA were dissolved in NMP. 3,4-dicarboxy-1,2,3,4-tetrahydronaphthalene-1-succinic dianhydride (referred to as TDA hereinafter, 15.01 g, 0.05 mole) and NMP (30 g) were then added, and reaction was conducted for 6 hours at room temperature. NMP (97 g), acetic anhydride (5.61 g), and pyridine (19.75 g) were further added. Stirring was continued for a further 2 hours at 60° C. to conduct an imidization reaction. The reaction solution was then poured into water (1500 ml) to precipitate a polymer. The polymer obtained after filtering was dried in a vacuum oven at 60° C. to obtain a polyimide polymer (A-2-6).

[Preparation of Liquid Crystal Alignment Agent and Liquid Crystal Display Element]

In the following Examples and Comparative Examples, liquid crystal alignment agents and liquid crystal display elements were prepared and were evaluated according to the following evaluating methods.

[Evaluating Methods]

1. Viscosity:

Viscosity of each of the prepared liquid crystal alignment agents in the following Examples and Comparative Examples was determined using an E-type rotational viscometer (manufactured by Toki Sangyo Co., Ltd., Mode Viscometer TV-22) at 6 rpm at 25° C. The results are listed in Table 1 in a unit of cps.

2. Coating Ability:

Each of the prepared liquid crystal alignment agents was coated on a substrate using a printing method, and was processed by pre-baking and post-baking treatments. The surface of the coating film was viewed using a microscope to check whether there are any coating defects, including pinholes or other defects (for example, uneven film thickness, and the like).

γ: Surface of the coating film is smooth and has no coating defects.

Δ: Surface of the coating film has a small amount of pinholes and/or slight other coating defects.

X: Surface of the coating film has a large amount of pinholes and/or significant other coating defects.

XX: A coating film can not be formed or has a very large amount of pinholes and/or extremely significant other coating defects.

3. Storage Stability:

The pretilt angle was measured by a crystal rotation method using an He—Ne laser light (manufactured by CHUO PRECISION INDUSTRIAL CO., LTD., Model OMS-CM4RD) according to the method described in T. J. Scheffer, et. al., *J. Appl. Phys., vol.* 19, 2013 (1980).

A pretilt angle of a liquid crystal cell formed with a liquid crystal alignment film made of a liquid crystal alignment agent as prepared and a pretilt angle of a liquid crystal cell formed with a liquid crystal alignment film made of the liquid crystal alignment agent after being stored at 45° C. for 7 days were measured. The variation of the pretilt angle was determined using the following formula:

Variation of pretilt angle=$|(a)-(b)|/(a)\times 100\%$ wherein (a) is a pretilt angle of a liquid crystal cell formed with a liquid crystal alignment film made of a liquid crystal alignment agent as prepared, and (b) is a pretilt angle of a liquid crystal cell formed with a liquid crystal alignment film made of the liquid crystal alignment agent after being stored at 45° C. for 7 days.

γ: Variation of pretilt angle <5%.

Δ: Variation of pretilt angle ranging from 5% to 10%.

X: Variation of pretilt angle >10%.

4. Ageing Stability of Pretilt Angle:

The pretilt angle was measured by a crystal rotation method using an He—Ne laser light (manufactured by CHUO PRECISION INDUSTRIAL CO., LTD., Model OMS-CM4RD) according to the method described in T. J. Scheffer, et. al., *J. Appl. Phys.*, vol. 19, 2013 (1980).

A pretilt angle of a liquid crystal cell formed with a liquid crystal alignment film made of a liquid crystal alignment agent as prepared and a pretilt angle of the liquid crystal cell after being placed at 60° C. for 100 hours were measured. The variation of the pretilt angle was determined using the following formula:

Variation of pretilt angle=$|(c)-(d)|/(c)\times 100\%$ wherein (c) is a pretilt angle of a liquid crystal cell formed with a liquid crystal alignment film made of a liquid crystal alignment agent as prepared, and (d) is a pretilt angle of the liquid crystal cell after being placed at 60° C. for 100 hours.

γ: Variation of pretilt angle <5%.

X: Variation of pretilt angle 5%.

5. Image Sticking:

After applying 10.0 volts of direct current to the manufactured liquid crystal cell for 48 hours, the voltage application was terminated and visual observation was conducted to determine whether or not the image sticking occurs.

γ: The image sticking phenomenon did not occur.

X: The image sticking phenomenon occurred.

Example 1

100 parts by weight of the polymer (A-1-1) obtained from Synthesis Example 1 was dissolved in a co-solvent of 785 parts by weight of NMP/785 parts by weight of ethylene glycol n-butyl ether (referred to as BC hereinafter) at room temperature to obtain an alignment agent solution.

The alignment agent solution was coated onto an ITO (indium-tin-oxide) glass substrate using a printing machine (manufactured by Japan Nissha Printing Co., Ltd., Model S15-036), after which the ITO glass substrate coated with the alignment agent solution was pre-baked on a heating plate at a temperature of 100° C. for five minutes, and was then post-baked in a hot air circulation baking oven at a temperature of 220° C. for 30 minutes to form a film on the ITO glass substrate. The thickness of the film was measured to be around 800±200 Å using a film thickness measuring device (manufactured by KLA-Tencor, Model Alpha-step 500).

An alignment (rubbing) process was carried out on the surface of the film using a rubbing machine (manufactured by Iinuma Gauge Mfg. Co., Ltd., Model RM02-11). The stage moving rate was 50 mm/sec. When rubbing, a hair push-in length was 0.3 mm, and was unidirectionally rubbed once. Two glass substrates each coated with the liquid crystal alignment film were manufactured by the aforementioned steps. Thermo-compression adhesive agent was applied to one glass substrate, and spacers of 4 μm were sprayed on the other glass substrate. The two glass substrates were aligned and bonded together in a vertical direction, and then 10 kg of pressure was applied using a thermocompressor to carry out thermocompression at 150° C. Liquid crystal was poured using a liquid crystal pouring machine (manufactured by Shimadzu Corporation, Model ALIS-100X-CH), ultraviolet light was then used to harden a sealant to seal the liquid crystal injection hole, and an annealing treatment was conducted in an oven at 60° C. for 30 minutes, thereby manufacturing a liquid crystal cell and further manufacturing a liquid crystal display element.

The liquid crystal alignment agent and the liquid crystal display element obtained therefrom were evaluated according to the aforesaid evaluating methods. The evaluating results are shown in Table 1.

Examples 2 to 6

Examples 2 to 6 were conducted in a manner identical to that of Example 1 using the polymers, the organic solvents, and/or the additives shown in Table 1. The liquid crystal alignment agents and the liquid crystal display elements obtained in Examples 2 to 6 were evaluated according to the evaluating methods, and the results are shown in Table 1.

It should be noted that the alignment process was omitted in Examples 2, 3, 5, and 6.

Comparative Examples 1 to 6

Comparative Examples 1 to 6 were conducted in a manner identical to that of Example 1 using the polymers, the organic solvents, and the additives shown in Table 1. The liquid crystal alignment agents and the liquid crystal display elements obtained in Comparative Examples 1 to 6 were evaluated according to the evaluating methods, and the results are shown in Table 1.

It should be noted that the alignment process was omitted in Comparative Examples 2 and 6.

In view of the aforesaid, the liquid crystal alignment agent of the present invention, which includes a polymer containing a specified repeating structural unit and which has a viscosity ranging from 5 to 40 cps at 25° C., possesses improved alignment properties in terms of storage stability, aging stability of pretilt angle, and reduction of image sticking.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A liquid crystal alignment agent, comprising:
a polymer containing a repeating structural unit represented by the following formula (I):

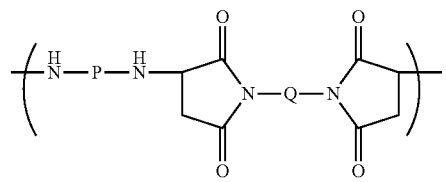

wherein each of P and Q is a divalent organic group; and
an organic solvent for dissolving said polymer, wherein the liquid crystal alignment agent has a viscosity ranging from 8 to 35 cps at 25° C.,

TABLE 1

| | Components | Examples | | | | | | Comparative Examples | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Polymers (pbw) | A-1-1 | 100 | | | | | | | | | | | |
| | A-1-2 | | 100 | | | | | | | | | | |
| | A-1-3 | | | 100 | | | | | | | | | |
| | A-1-4 | | | | 100 | | | | | | | | |
| | A-1-5 | | | | | 100 | | | | | | | |
| | A-1-6 | | | | | | 100 | | | | | | |
| | A-2-1 | | | | | | | 100 | | | | | |
| | A-2-2 | | | | | | | | 100 | | | | |
| | A-2-3 | | | | | | | | | 100 | | | |
| | A-2-4 | | | | | | | | | | 100 | | |
| | A-2-5 | | | | | | | | | | | 100 | |
| | A-2-6 | | | | | | | | | | | | 100 |
| Organic Solvents (pbw) | B-1 | 785 | 830 | 870 | 785 | 740 | 700 | 785 | 785 | 785 | 785 | 785 | 785 |
| | B-2 | 785 | 740 | 700 | 785 | 830 | 870 | 785 | 785 | 785 | 785 | 785 | 785 |
| Additives (pbw) | C-1 | | | | | 10 | | 2 | | | | | |
| | C-2 | | | | | | 5 | 3 | | | | | |
| Results | Viscosity | 36 | 20 | 18 | 40 | 15 | 5 | 3 | 50 | 43 | 30 | — | — |
| | Coating Ability | Y | Y | Y | Y | Y | Y | XX | X | X | Y | Y | Δ |
| | Storage Stability | Y | Y | Y | Y | Y | Y | Δ | X | X | X | X | Δ |
| | Ageing Stability of Pretilt Angle | Y | Y | Y | Y | Y | Y | Y | Y | Y | Y | X | X |
| | Image Sticking | Y | Y | Y | Y | Y | Y | X | Y | X | X | X | Y |

Notes:
B-1: N-methyl-2-pyrrolidone;
B-2: ethylene glycol n-butyl ether;
C-1: N,N,N',N'-tetraglycidyl-4,4'-diaminodiphenylmethane;
C-2: N,N,N',N'-tetraglycidyl-m-xylenediamine As shown in Table 1, all of the evaluated properties of the liquid crystal display elements of Examples 1 to 6 are good. However, not all of the evaluated properties of the liquid crystal display elements of Comparative Examples 1 to 6 are good.

wherein said polymer is obtained by subjecting a diamine compound to polymerization in the presence of an acidic catalyst, and
wherein said diamine compound is at least one selected from the group consisting of compounds represented by the following formulas (I-1) to (I-5) and (1) to (6):

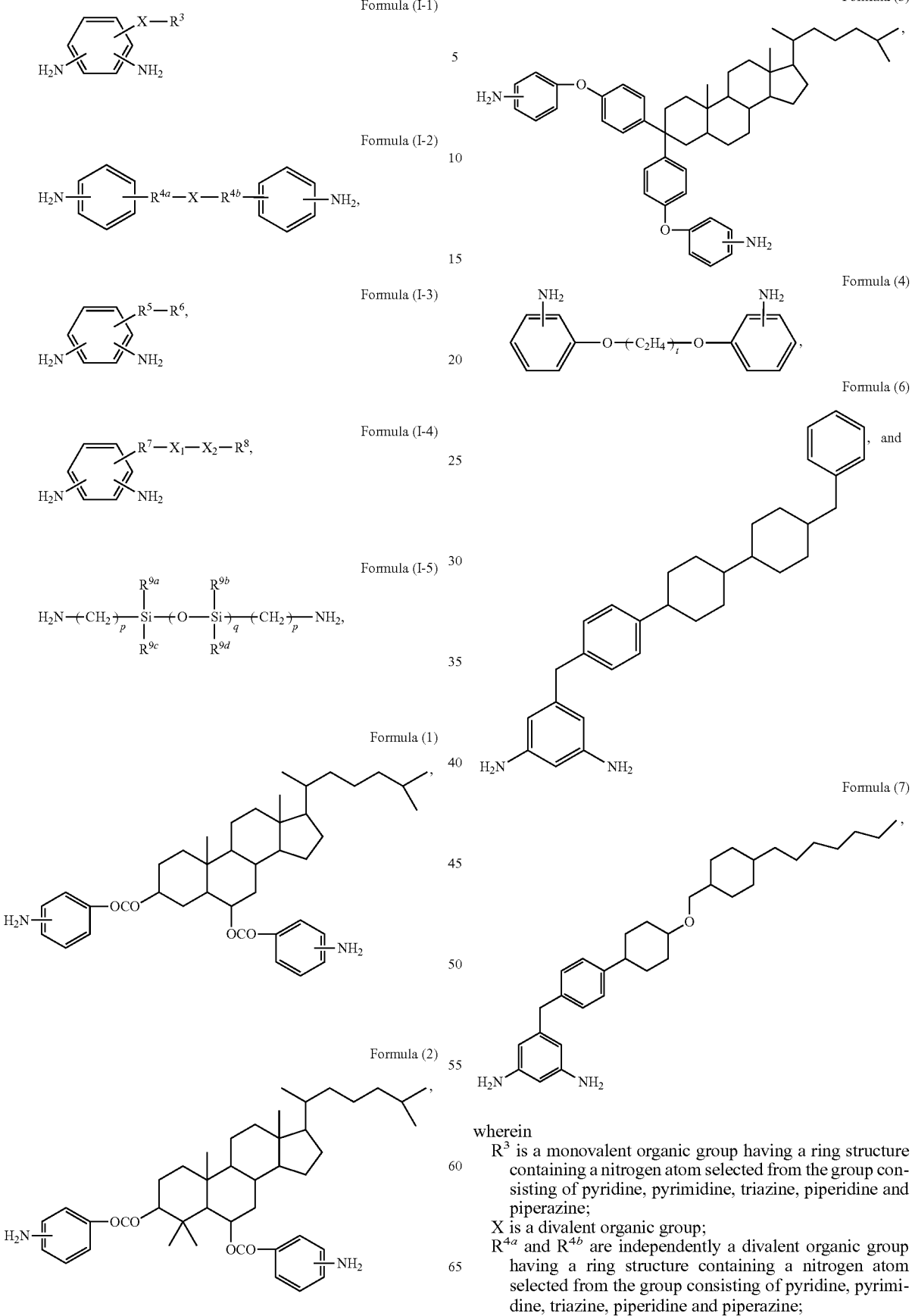

wherein
R³ is a monovalent organic group having a ring structure containing a nitrogen atom selected from the group consisting of pyridine, pyrimidine, triazine, piperidine and piperazine;
X is a divalent organic group;
R⁴ᵃ and R⁴ᵇ are independently a divalent organic group having a ring structure containing a nitrogen atom selected from the group consisting of pyridine, pyrimidine, triazine, piperidine and piperazine;

$R^5$ and $R^7$ are independently a divalent organic group selected from the group consisting of —O—, —COO—, —OCO—, —NHCO—, —CONH—, and —CO—;

$R^6$ is a monovalent organic group having a group selected from the group consisting of a steroid skeleton, a trifluoromethyl group, and a fluoro group, or an alkyl group having 6 to 30 carbon atoms;

$X_1$ and $X_2$ are independently a divalent organic group selected from the group consisting of an alicyclic group, an aromatic group, and a heterocyclic group;

$R^8$ is selected from the group consisting of an alkyl group having 3 to 18 carbon atoms, an alkoxy group having 3 to 18 carbon atoms, a fluoroalkyl group having 1 to 5 carbon atoms, a fluoroalkoxy group having 1 to 5 carbon atoms, a cyano group, and halogen atoms;

$R^{9a}$, $R^{9b}$, $R^{9c}$, and $R^{9d}$ are independently a hydrocarbon group having 1 to 12 carbon atoms;

p is an integer ranging from 1 to 3;

q is an integer ranging from 1 to 20; and t is an integer ranging from 2 to 12.

2. The liquid crystal alignment agent as claimed in claim 1, wherein said organic solvent is in an amount of 400 to 10,000 parts by weight based on 100 parts by weight of said polymer.

3. The liquid crystal alignment agent as claimed in claim 2, wherein said organic solvent is in an amount of 500 to 5,000 parts by weight based on 100 parts by weight of said polymer.

4. A liquid crystal alignment film made of the liquid crystal alignment agent as claimed in claim 1.

5. A liquid crystal display element, comprising the liquid crystal alignment film as claimed in claim 4.

\* \* \* \* \*